United States Patent [19]

Mulholland et al.

[11] Patent Number: 5,123,071
[45] Date of Patent: Jun. 16, 1992

[54] OVERCONNECTOR ASSEMBLY FOR A PAIR OF PUSH-PULL COUPLING TYPE OPTICAL FIBER CONNECTORS

[75] Inventors: Denis G. Mulholland, Lancaster; Ronald R. Schaffer; Gary N. Warner, both of Harrisburg, all of Pa.

[73] Assignee: AMP Incorporated, Harrisburg, Pa.

[21] Appl. No.: 491,755

[22] Filed: Mar. 9, 1990

[51] Int. Cl.5 .............................................. G02B 6/38
[52] U.S. Cl. ...................................... 385/53; 385/55; 385/56
[58] Field of Search ............................ 350/96.2, 96.21; 439/731, 732, 686, 687, 688, 695; 385/53, 55, 56, 60, 66

[56] References Cited

U.S. PATENT DOCUMENTS

| | | | |
|---|---|---|---|
| 2,756,402 | 7/1956 | Haworth et al. | 439/687 X |
| 3,514,744 | 5/1970 | Hollander | 439/687 X |
| 4,611,887 | 9/1986 | Glover et al. | 350/96.21 |
| 4,715,675 | 12/1987 | Kevern et al. | 350/96.2 |
| 4,762,389 | 8/1988 | Kaihara | 350/96.21 |
| 4,779,950 | 10/1988 | Williams | 350/96.21 |
| 4,798,440 | 1/1989 | Hoffer et al. | 350/96.2 |
| 4,872,736 | 10/1989 | Meyers et al. | 350/96.20 |
| 4,953,929 | 9/1990 | Basista et al. | 350/96.2 |

FOREIGN PATENT DOCUMENTS

| | | | |
|---|---|---|---|
| 62-26141 | 8/1988 | Japan . | |
| 9103604 | 1/1986 | United Kingdom | 6/38 |

Primary Examiner—Akm E. Ullah
Assistant Examiner—Stephen W. Barns
Attorney, Agent, or Firm—Gerald G. Kita

[57] ABSTRACT

An overconnector assembly 10 converts a pair of simplex optical fiber connectors 1, each having a defined exterior profile, into a unitary structure that operates as a duplex connector. The overconnector assembly 10 comprises a bipartite structure of complementary parts 76, 77. Each part has a double compartment interior 78, 79. The interior of each compartment 78, 79 has a precisely shaped profile conforming to the shape of the defined exterior profile of each of the pairs of simplex optical fiber connectors 1.

6 Claims, 6 Drawing Sheets

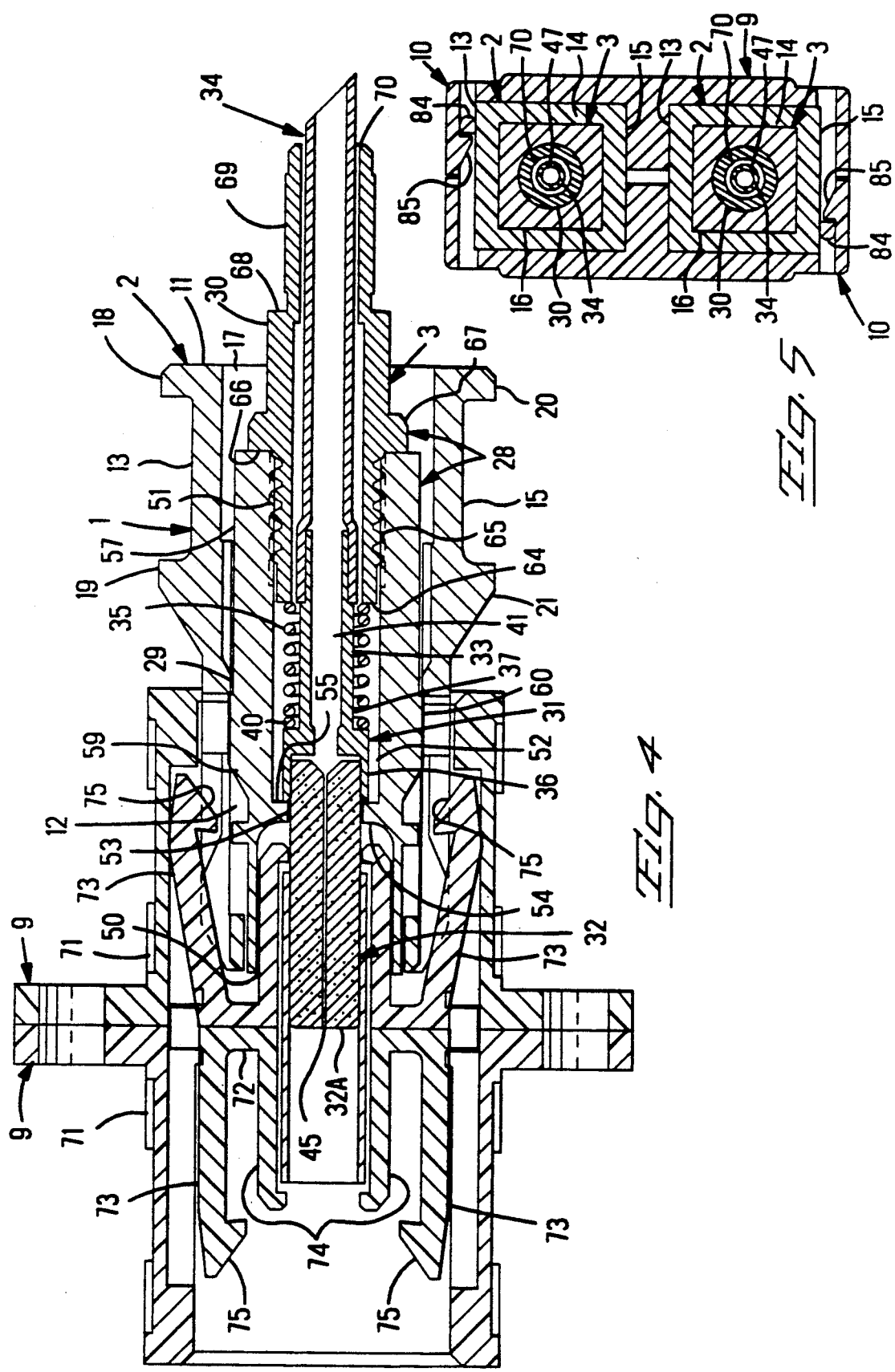

OVERCONNECTOR ASSEMBLY FOR A PAIR OF PUSH-PULL COUPLING TYPE OPTICAL FIBER CONNECTORS

FIELD OF THE INVENTION

The present invention relates to optical fiber connectors for optical communications applications and more particularly to a overconnector for a pair of push-pull coupling type optical fiber connectors permitting simultaneous coupling and uncoupling manipulation of the connector pair.

BACKGROUND OF THE INVENTION

Kaihara, U.S. Pat. No. 4,762,389 points out that various kinds of optical fiber connectors are known for connecting two optical fibers and/or an optical fiber and an optical component such as a light emitting, or light receiving element. Kaihara further point out that one type of such connector is a pair of plugs with each fixed to an end of an optical fiber. These connectors include an adapter through which the optical fibers are interconnected with the optical axis of the plugs aligned. When utilized with a light emitting and a light receiving element, the plugs are inserted into a receptacle in which the light emitting or light receiving element is contained.

Various types of connections between adapters and plugs are known, including screw lock types, bayonet locks and the push-on lock type also known as push-pull coupling type. Umeki, et al, Japanese Showa 60-218932 discloses a push-pull coupling type. It includes an adapter equipped with an alignment sleeve and resilient catch pieces. The pieces are in cantilever form with protrusions and a claw attached to the tip of the form. The connector also includes a frame that contains an integrated ferrule and a through passageway from the rear to the front of the ferrule. The frame has protruding parts that are caught by claws of the resilient catch pieces of the adapter. A resilient inner tube shaped in the form of a round tube has an inside diameter almost equal to the outside diameter of the optical fiber cable and an outside diameter almost equal to the hole in the rear portion of the plug frame. A cord tube has a flexible part at its front end which, when inserted into the hole in the rear of the plug frame, is secured to the frame by the bending of the flexible part. The plug frame also has a finger grip mounted on its outside with raised parts. When the ferrule of the plug frame is inserted into or pulled from the alignment sleeve, the raised parts of the plug frame contact the protrusions of the cantilever form and push the resilient claws to the outside allowing the protrusions to pass. The plug frame may have a finger grip housing which is able to slide forward and backward with respect to the plug frame and, additionally, which has raised parts which release the catch of claws on the protruding parts of the plug frame when the finger grip housing is moved backward.

Iwasa, et al, Japanese Showa 62-26141, relates to a duplex type of connector in which a permanent housing provides two alignment sleeves and two ferrules to permanently encompass two optical fibers of the push-pull coupling type of connector. As pointed out by Iwasa, high density mounting of connectors is more readily attainable with such connectors than when two single core optical connectors are utilized. Similarly, Myers, et al, U.S. Pat. No. 4,872,736, relates to a duplex connector encompassed within a release cover to provide a plug of the push-pull coupling type.

Kaihara, et al, U.S. Pat. No. 4,762,389, discloses both a simplex pin-type of plug and a duplex pin plug that includes a cooperative pair of plug holders accommodated within a single housing. This second embodiment comprising the plugs encompassed within a singular permanent housing is advantageous in that it permits simultaneous connect and disconnect of the fiber plugs from the pair of other optical fibers or optical components such as a light emitting and light detecting element.

Advantageous would be the capability of coupling plug holders which have been provided as individual elements within an attachable and detachable overconnector, thereby providing the advantages of the optical fiber connector with dual optical fiber plugs encompassed within a permanent housing as taught by Iwasa, et al, Japanese Showa 62-26141, Myers, et al, U.S. Pat. No. 4,872,736, and by Kaihara, U.S. Pat. No. 4,762,389, to be obtained in the instance where individual optical fiber connectors are provided, each having a single optical fiber plug therein, but in an application that would permit or require a dual connection such as with an optical component having both a light emitting and a light detecting element.

The connector of Kaihara, U.S. Pat. No. 4,762,389, is a push-pull coupling type of connector comprising an optical fiber plug with a the plug including a ferrule for fixing the optical fiber on a center axis thereof. The ferrule has a terminal tip. A spring member is positioned coaxially with the ferrule and along an outer periphery thereof. A slipout-preventing member is fixed to the ferrule for preventing the spring member from slipping out. A first housing accommodates the ferrule, the spring member and the slipout-preventing member. The first housing is provided with a pair of parallel extensions, each extending toward the terminal tip of the ferrule along an opposite side periphery of the ferrule, and a pawl protruding from a tip of each of the extensions toward the center axis of the ferrule. A second housing accommodates the first housing and is slidable a predetermined amount in a direction parallel to the center axis of the ferrule in contact with an outer periphery of the first housing. The second housing is so configured that the pair of parallel extensions snugly fit into the second housing and are prevented from expanding from each other at a position where the second housing is moved forward along the pair of parallel extensions.

The fiber connector of Kaihara also includes an adapter for receiving the optical fiber plug. The adapter includes a block provided with a cylindrical bore for receiving the ferrule. The block has a pair of parallel outer side surfaces which are disposed symmetrically around a center axis of the bore. The block also has a recess provided in a part of its side surfaces. The plug and the adapter are connected by mating the recesses of the block of the adapter with the respective pawls of the first housing while inserting the tip of the ferrule into the cylindrical bore of the adapter. The second housing is then slid into position.

The present invention is an overconnector assembly for a pair of simplex optical fiber connectors, each having a defined exterior profile and structure that operates the simplex optical fiber connectors as a duplex connector. The structure is characterized by easy snap-on connection to a pair of simplex connectors of the push-pull type to thereby form a single body to serve the functions provided with the duplex connector of Iwasa, et al or of Kaihara.

The present invention is an overconnector for a pair of simplex optical fiber connectors which permits the coupling of simplex connectors of the push-pull type. The overconnector of the present invention is characterized by easy snap-on connection to a pair of simplex connectors of the push-pull type to thereby form a single body to serve the functions provided with the duplex connector of Iwasa, et al or of Kaihara.

Gerace, et al, U.S. patent application Ser. No. 07/159,151, published EPC Specification No. 0330399, Aug. 30, 1989, relates to a sheath connector for an optical fiber. This connector may be adapted to a push-pull type connector by a plug housing in two sections with biasing surface and slot for mating with resilient catch pieces of an adapter. The present invention particularly relates to an overconnector assembly for a pair of simplex type connectors that incorporate the Gerace, et al sheath connector.

SUMMARY OF THE INVENTION

The present invention relates to an overconnector assembly of the push-pull coupling type featuring a structure that is particularly advantageous in converting a pair of simplex connectors of the push-pull coupling type into a duplex connector of the push-pull coupling type. The overconnector assembly comprises a pair of simplex optical fiber connectors, each having a defined exterior profile and structure that operates the simplex optical fiber connectors as a duplex connector. The overconnector assembly comprises a bipartite structure of complimentary parts which a double compartment interior, the interior of each compartment having a precisely shaped profile conforming to the shape of the defined exterior profile of each of the pair of simplex optical fiber connectors. Each part of the bipartite structure has a common base having three depending walls defining a double compartment interior. Each compartment is open at one side. Each part of the overconnector assembly further has a snap catch located at one outer depending wall and a projection with beveled leading located at an opposite outer depending wall. The two parts complimentarily fit together to form the overconnector assembly of the present invention.

It is particularly an advantage of the present invention that the double compartments which result from the connection of the two parts of the overconnector assembly, form precisely shaped interior profiles which conform to defined exterior profiles of each of the pair of the simplex connectors. The overconnector assembly is adaptable to connecting a pair of simplex optical fiber connectors such as those of Gerace, et al. In such instance, the overconnector assembly first part encompasses three sides of the second housing of the simplex connector and is open on a fourth side for accepting the fit of the second part. Each of the two walls has a projection with a surface slanted in a direction leading toward the second part during overconnection. In each instance of application of the overconnector assembly of the present invention to simplex connectors, the overconnector assembly is characterized as being capable of temporary snap-on fit to the simplex connectors as opposed to providing a permanent encompassing housing such as with the duplex connectors of either Iwasa, et al, or of Kaihara.

BRIEF DESCRIPTION OF THE DRAWINGS

FIG. 4 is a view in section, of adapter and mated push-pull coupling plug.

FIG. 5 is a section view through line 5-5 of FIG. 8.

FIG. 6 is an enlarged elevation view in section of some of the parts illustrated in FIGS. 3, 4 and 5.

DESCRIPTION OF A PREFERRED EMBODIMENT

The preferred embodiment of the present invention is an overconnector assembly for a pair of simplex optical fiber connectors, each characterized as comprising an optical fiber plug assembly. Each optical fiber plug assembly includes a plug housing with spacing through its body at a surface of a forward section and with a defined exterior profile at a rearward section. A connector assembly is accommodated by and substantially within the plug housing. The connector assembly has, disposed at one exterior flexible surface thereof, a ridge and slot and, in conjunction therewith, a tab. The ridge, slot and tab are exposed through the spacing of the surface of the forward section of the plug housing. Further included is a ferrule for fixing an optical fiber on a center axis thereof. The ferrule is accommodated within the connector assembly.

The overconnector assembly is a bipartite body comprising a first and second part. Each part has a double compartment interior. The interior of each compartment has a precisely shaped profile conforming to the shape of the defined exterior profile of each of the pairs of simplex optical fiber connectors.

Figure 1:
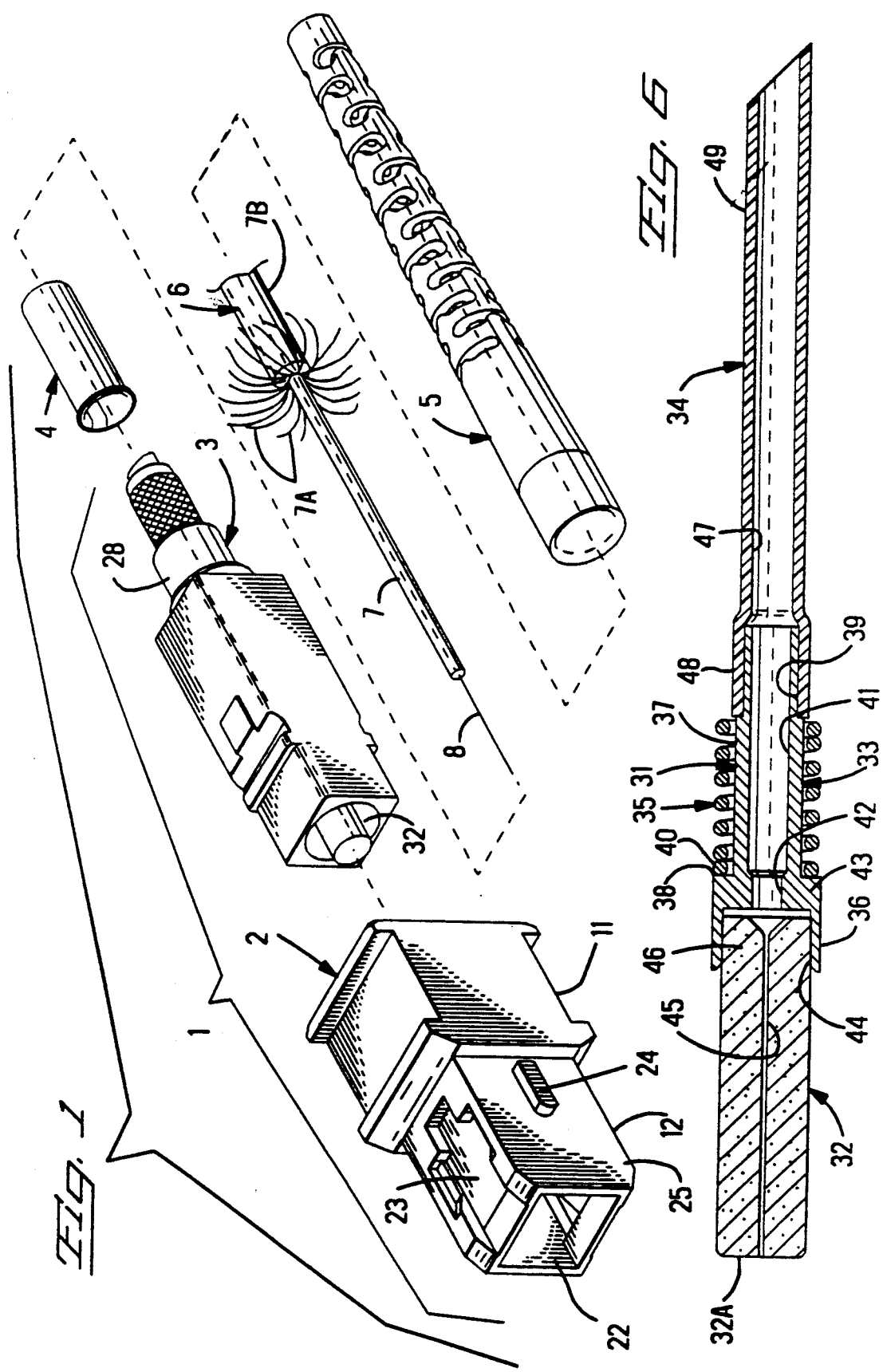
FIG. 1 is a perspective view, partially exploded, of an optical fiber cable and a push-pull coupling plug of a simplex connector.

Referring to FIG. 1, the present invention relates to an improvement for securing, in pairs, a plug assembly 1 of the push-pull type comprising a plug housing 2 and a connector assembly 3. Shown also is crimp ferrule 4 and tubular strain relief boat 5 for encompassing optical fiber cable 6. The cable 6 includes an elongated central optical fiber 8 concentrically encircled by a buffer 7, together comprising a buffer covered fiber 7, 8. The cable 6 further includes a load bearing portion 7A in the form of elongated strength members 7A that extend lengthwise of the cable 6. The strength members 7A are distributed over the outer diameter of the buffer covered fiber 8. The cable 6 further includes an outer jacket 7B of polymeric material enclosing the strength members 7A. Parts of the cable 6 are cut away as shown to provide; a length of fiber 8 projecting from the buffer 7 of the cable 6, and a length of the buffer covered fiber 7, 8 projecting from the strength members 7A, and lengths of the strength members 7A projecting from the jacket 7B. The buffer covered fiber 7, 8 is slidable within the jacket 7B and within the surrounding strength members 7A.

Figure 2:
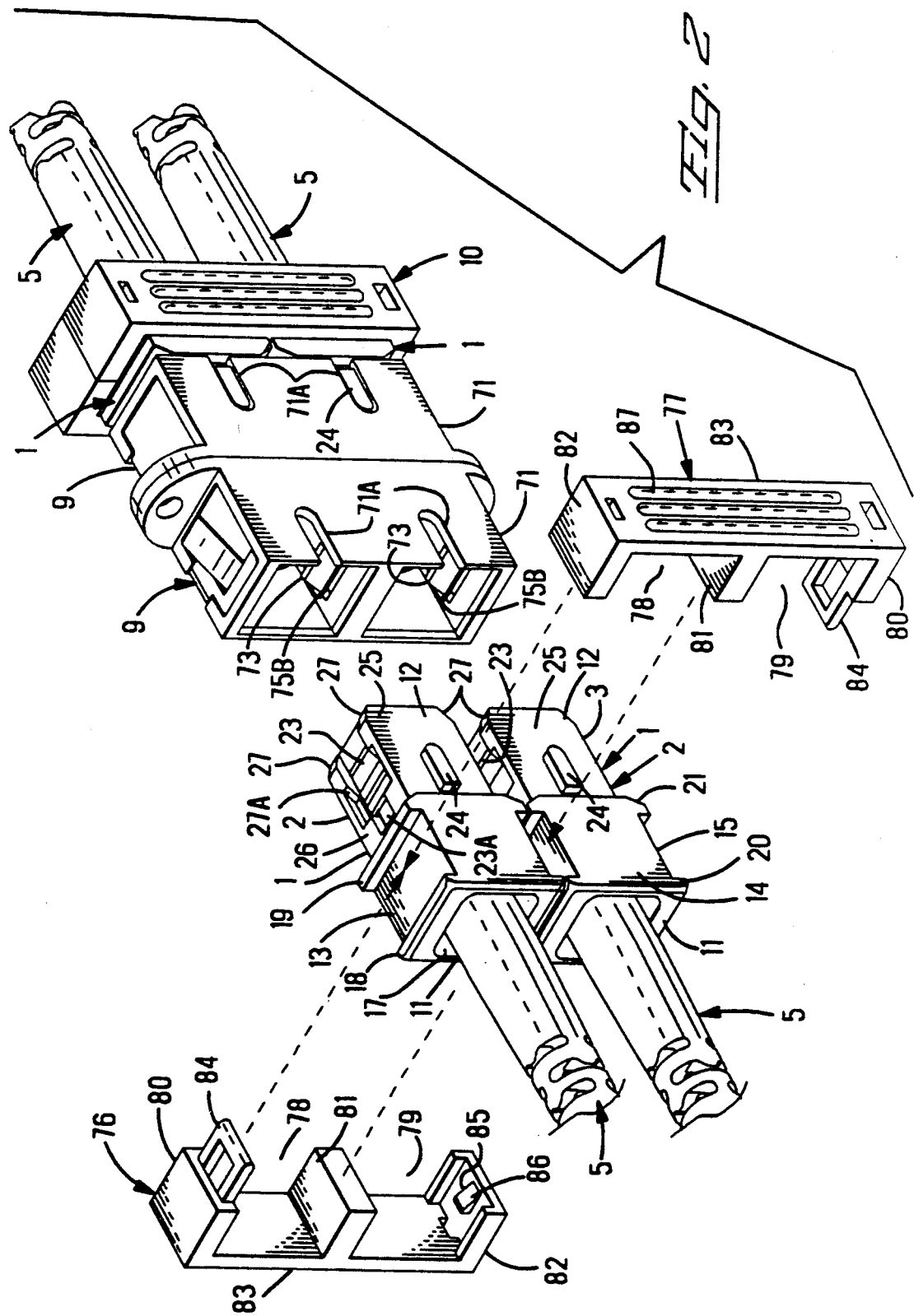
FIG. 2 is a perspective view of a pair of push-pull coupling plugs and adapter connected to another adapter with connecting pair of push-pull coupling plugs, each pair secured by an overconnector assembly, with the view partially exploded to show the fit of one of the overconnector assemblies.

Referring to FIG. 2, is shown a pair of push-pull coupling plug assemblies 1 and adapter 9 connected to another adapter 9 with connecting pair of push-pull coupling plug assemblies 1. Each pair of plug assemblies 1, is secured by an overconnector assembly 10.

As shown in FIGS. 1 through 7, the plug housing 2 of plug assembly 1 has rear section 11 and forward section 12. Rear section 11 is a tubular sleeve comprising four flat surface areas 13, 14, 15, and 16 forming passageway 17 for receiving connector assembly 3. Top surface 13 and bottom surface 15 have corresponding raised ridges 18 and 19 and 20 and 21 at edges of each surface 13 and 15, FIG. 3.

Forward section 12 is integral with rear section 11 to form a single body, the plug housing 2. Forward section 12 is also a tubular sleeve with passageway 22, FIGS. 3 and 7. It has shaped openings 23, FIG. 2, with notch 23A to receive and dispose slots 61, ridges 62 and raised tabs 63 of connector assembly 3 as hereinafter described with reference to FIG. 3 and tabs 24 on opposite opposing faces 25, FIGS. 1 and 2, for fit to the slots 71A of adapter 9, again as hereinafter described. Opposing faces 25 are beveled at from edges 27, FIG. 2, and following edges 27A.

Figure 3:
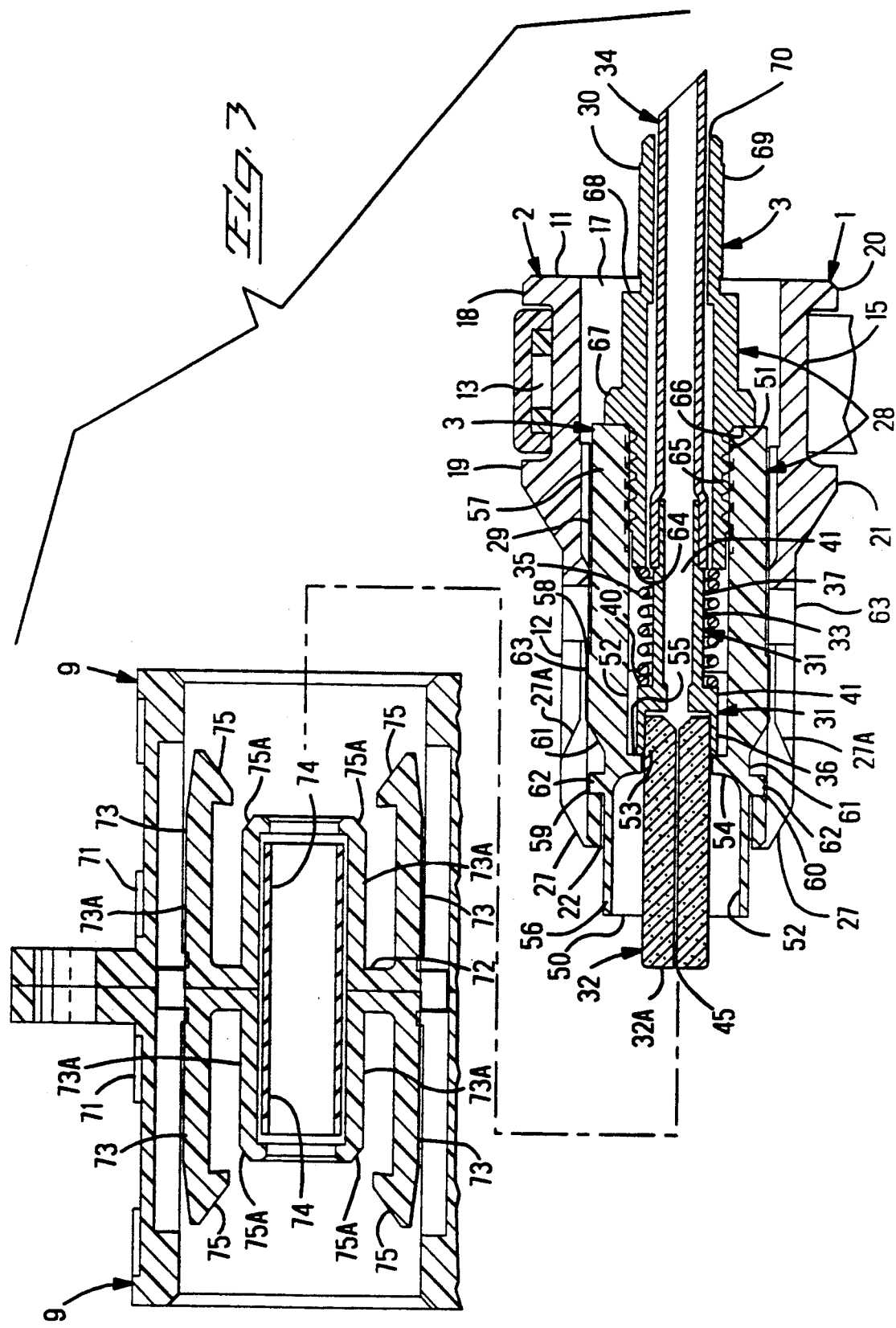
FIG. 3 is a view in section, of adapter and push-pull coupling plug before mating.
Figure 7:
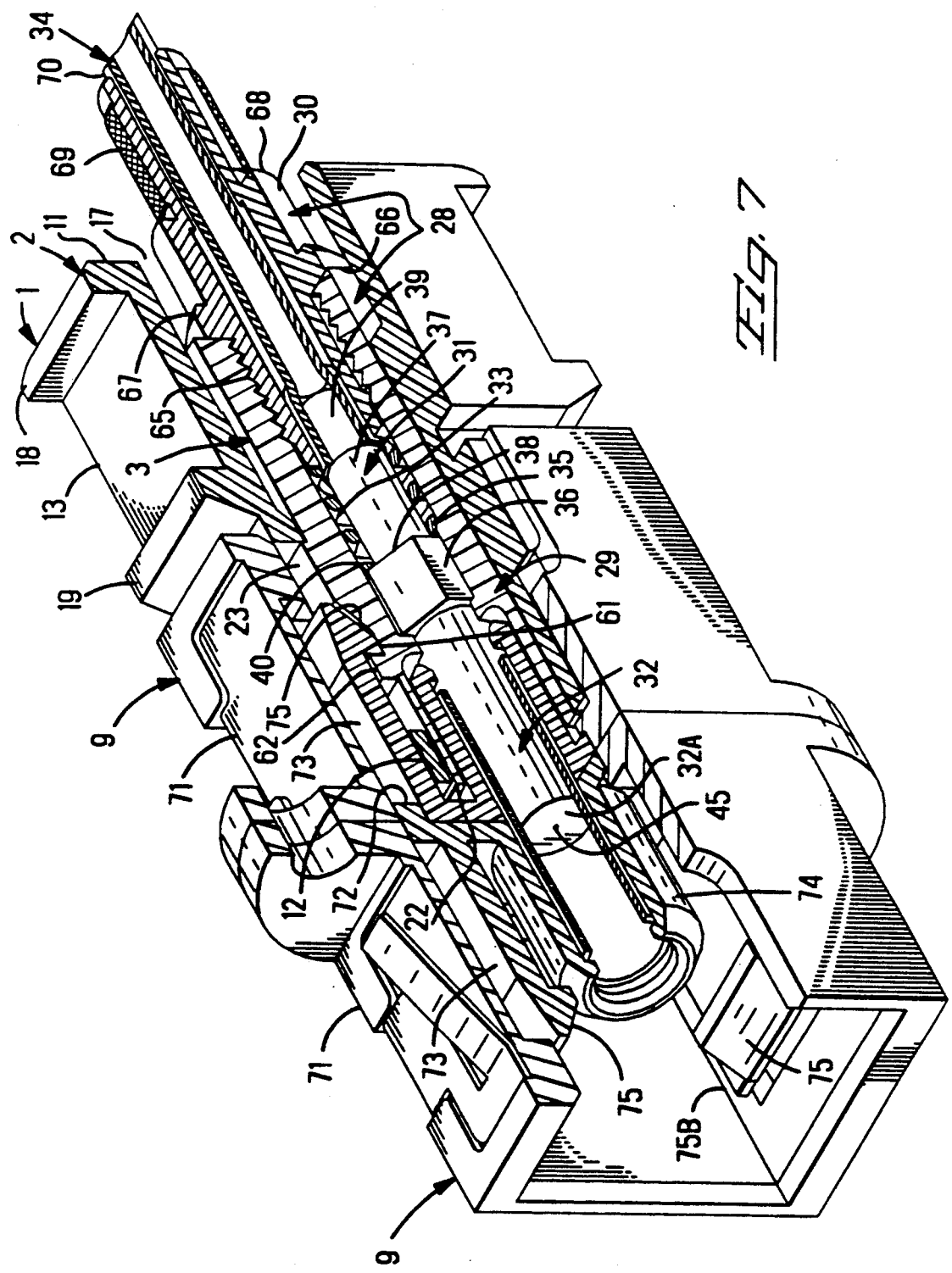
FIG. 7 is a perspective view of mated adapter and push-pull coupling plug and complimentary adapter for a second plug, the view with a quarter section cut away to show interior.

As shown in FIGS. 1 and 3 through 7, and particularly FIG. 6, the connector assembly 3 includes; a bipartite shell 28, FIG. 3, comprised of a front plastic shell portion 29 and a rear metal shell portion 30. Also shown is a holder 31 for the optical fiber and buffer 7, 8 comprised of a ceramic alignment ferrule 32, having bore 45, front end 32A and further including metal body 33, sheath 34, and biasing spring 35 of coil form.

The body 33 includes an enlarged front end 36 with an external hexagonal cross section, a reduced external diameter intermediate portion 37 intersecting a rear facing shoulder 38 of the enlarged front end 36, and a rear end 39 with a reduced external diameter. The coil spring 35 is assembled as shown, to encircle the reduced external diameter portion 37 with a front end 40 of the coil spring 35 engaged and biased against the shoulder 38.

The body 33, FIG. 6, includes an axial passageway 41 extending from the rear end 39. The passageway 41 has a reduced diameter, funnel entryway 42 extending through an internal transverse web 43, and an enlarged diameter counterbore 44 in the front end 36. The ceramic alignment ferrule 32 has a central longitudinal bore 45 aligned with the entryway 42. A rear end 46 of the ferrule 32 is press fit in the counterbore 44 of the body 33. The sheath 34 is a length of flexible plastic or metal tubing having a hollow interior 47, a front end 48 assembled to encircle the reduced diameter rear end 39 of the body 33, and a rear end portion 49. The sheath 34 is held on the body 33 by friction or interference fit.

The front shell portion 29, FIG. 3, includes an axial cavity 50 having an enlarged diameter rear end 51 that is internally threaded, an intermediate portion 52 having a hexagon shaped periphery, and a reduced diameter front portion 53 extending through an end wall 54 of the front body portion 29. Enlarged diameter rear end 51 is internally threaded for fit of rear shall portion 30 as hereinafter described. However, it should be pointed out that although this present embodiment shows attachment by threading, rear shell portion 30 may be attached to front shell portion 29 by other conventional means such as by means of glue or adhesive or ultrasonic connection of one part to the other. A rear facing, radially extending internal shoulder 55 is defined at the intersection of the portions 52 and 53. A rectangular hood 56 with an enlarged internal diameter extends forwardly from the front of the end wall 54. Further, the front shell portion 29 includes a rear end 57 with a slightly reduced external diameter intersecting a rear facing external shoulder 58. Front shell portion 29 at the upper 59 and lower 60 surfaces of its outer profile has slots 61 and ridges 62 for engaging the lips 75 of resilient catch pieces 73 of adapter 9, described below, and tabs 63 which impose outwardly. When connector assembly 3 is fitted within plug housing 2, slots 61 and ridges 62 are exposed by shaped openings 23 of the forward section 12 of plug housing 2. Tabs 62 nestle into notches 23A of the shaped openings 23 to prevent connector assembly 3 from escaping rearwardly out of plug housing 2.

The rear metal shell 30 includes a front end 64, an externally threaded forward portion 65 extending to a front facing external shoulder 66 defined by an exterior circumferential flange 67, a rear facing external shoulder 68 forwardly of a reduced external diameter rear end portion 69. The reduced diameter end portion 69 defines a cable anchoring portion. Rear shell portion 30 has axial passageway 70.

The holder 31 and the biasing spring 35 are assembled together and are assembled in the cavity 50 of the front shell portion 29, with the alignment ferrule 32 projecting through the end wall 54, forwardly of the end wall 54, and the hood 56, and with the sheath 34 projecting outwardly of the rear end 69 of the rear shell portion 30. The axial passageway 70 of the rear shell portion 30 is slidably assembled over the sheath 34 and is threadably advanced along the internally threaded rear end 57 of the front shell portion 29 until the shoulder 66 engages the rear end 57 of the front shell portion 29. The biasing spring 35 is in compression between the front end 64 of the rear shell portion 30 and the shoulder 38 of the body 33. Thereby the holder 31 is biased forwardly by the spring 35 and is mounted for axial slidable displacement and reciprocation with respect to the shell 28. The hexagonal front end 36 of the body 33 is confined by the hexagonal periphery of the cavity 50 to prevent rotation of the holder 31 in the cavity 50.

Adapter 9, FIG. 2, includes housing 71 with keying slots 71A, support 72, FIG. 3, passing vertically through the middle of the housing 71, resilient catch pieces 73 provided in pairs on both sides of support 72, cylindrical part 73A and adapter alignment sleeve 74 captured by lip 75A of part 73A. Each resilient catch piece 73 has beveled lip 75 as provided at a forward tip of each piece. In the embodiment shown, a single surface of lip 75 is beveled. In another embodiment of the present invention, the vertical planes forming the sides of lip 75 may be inwardly beveled as well to prevent snagging during entry of plug assembly 1. The adapter 9 further includes walls 75B, FIG. 2, providing flat surfaces on which opposing faces 26 of plug housing 2 reside when plug assembly 1 is inserted into adapter 9 as hereinafter described.

Assembly of the connector assembly 3 to the cable 6 is described as follows. The cable 6 is passed successively along the interiors of the strain relief boot 5 and the crimp ferrule 4. A quantity of a known, commercially available adhesive is deposited in the body 33 of the holder 31. For example, the adhesive may be injected by a syringe having an elongated hollow needle. The needle is introduced into the end portion 49 of the open tubular sheath 34. The rear end portion 49 of the sheath 34 projects outwardly from the portion 69 of the shell 28, and sheaths the needle during entry and withdrawal from the sheath 34. The shell 28 is protected against touching by the needle and against deposition of adhesive. The needle is passed substantially along the interior of the sheath 34 before depositing the quantity of adhesive within the body 33 of the holder 31. The adhesive is deposited near the front end 36 of the body 33, adjacent to the alignment ferrule 32 and remote from the open rear end portion 49 of the sheath 34. The sheath 34 prevents leaking of the adhesive from the holder 31 and prevents the adhesive from spreading over the spring 35 and the shell 28.

Following withdrawal of the needle, the alignment ferrule 32 is pressed against a stationary surface, for example, a table, not shown, causing the holder 31 to be slidably displaced, compressing the coil spring 35, and projecting the rear end portion 49 of the sheath 34 further outward from the rear end 69 if the rear shell circuit 39. The projecting rear end portion 49 of the sheath 34 is then cut away and removed from the connector assembly 3. Upon expansion of the coils of the biasing spring 35, the sheath 34 is retracted within the shell 28. The buffer covered fiber 7, 8 of the cable 6 is assembled in the rear end 69 of the shell 28 and into and along the sheath 34. The sheath 34 internal diameter receives and guides the buffer covered fiber 7, 8 for assembly along the passageway 41 of the body 33. The entry 42 of the passageway 41 guides the fiber 8 of the cable 6 into the bore 45 of the alignment ferrule 32. The periphery of the entry encircles and supports the buffer covered fiber 7, 8. The front end of the fiber 8 is exposed at a front end 32A of the ferrule 32 and is finished with an optical face, by a known procedure of polishing or fracturing. The sheath 34 closely encircles the buffer covered fiber 7, 8 to prevent wicking of the adhesive along the buffer covered fiber 7, 8 to such an extent that adhesive leaks from the open rear end of the sheath 34. The adhesive will be brought into contact with and will coat the fiber 8 and the buffer covered fiber 7, 8, and further, the adhesive will be urged forwardly of the holder 31 by the buffer covered fiber 7, 8, as the buffer covered fiber 7, 8 moves forwardly of the sheath 34 and of the body 33 and of the alignment ferrule 32. It is not necessary for the adhesive to wick in a direction rearward of the buffer covered fiber 7, 8 or rearwardly of the holder 31, since the adhesive is desired only to bond the buffer covered fiber 7, 8 within the holder 31, and the fiber 8 in the alignment ferrule 32.

The internal diameter of the shell rear end 69 is smaller than the external diameter of the cable jacket 7B. Thus, the jacket 7B remains outside of the shell 28, while the shell rear end 69 opposes a front end of the cable jacket 7B. The strength members 7A are placed to overlap the exterior of the shall rear end 69. The crimp ferrule 4 is displaced along the cable 6 to a position concentrically encircling the shell rear end 69. Pressure is radially applied on the crimp ferrule 4 to compress the ferrule radially inward to clamp the strength members 7A between the ferrule 4 and the shell rear end 69. Thereby, the strength members 7A are anchored to the shell rear end 69. The strain relief boot 5 is advanced along the cable 6 to encircle the ferrule 4 and the jacket 7B of the cable 6 where the jacket 7B projects adjacent to the shell 28. The buffer covered fiber 7, 8 and the holder 31 are joined together as a unit by adhesive for reciprocation and axial slidable displacement with respect to the shell 28, the strength members 7A and the jacket 7B of the cable 6. The end 32A of the alignment ferrule 32 engages a portion of the complementary connector and is slidably biased rearwardly of the connector assembly 3 against the bias of the coil spring 35. The bias of the coil spring 35 will urge the end 32A of the ferrule 32 in a direction forwardly of the connector assembly 3 and will engage against the portion of the complementary connector, to maintain a desired alignment of the optical face of the fiber 8 with the portion of the complementary connector.

With particular reference to FIGS. 1, 3, 4 and 5, as plug assembly 1 is inserted into adapter housing 71, each beveled leading edge 27 of each face 25 contracts a respective beveled leading edge of each lip 75 of each resilient catch piece 73 causing the catch piece 73 to raise along the bevel edges 27 of each face 25, over each ridge 62 and to seat within slot 61 of front shell portion 29 with surface 26 residing on flat surface walls 75B. At the same time, alignment ferrule 32 is received within alignment sleeve 74 of adapter 9 to permit precise end face to end face alignment of optical fiber 8, held in pressure contact via the biasing of biasing spring 35 against rear facing shoulder 38 of metal body 33 and, consequently, against ceramic alignment ferrule 32. Tabs 24 of forward section 12 of plug housing 2 mate with slots 71A of adapter housing 71 to assure polarization. On disconnect, rearward force causes beveled following edges 27A to lift catch piece 73 of adapter 9, thus disengaging each of lip 75 from respective slot 61 and ridge 62 of front shell portion 29 thereby permitting withdrawal of the plug assembly 1 from adapter 9.

With the embodiment shown, each simplex connector 3 of the plug assembly 1 is held in defined polarized relationship with each corresponding assembly 1 by means of the seat of tabs 24 to slots 71A of adapter 9. It should be understood that it is within the scope of this invention to provide simplex connectors held by overconnector 10 at a ninety degree orientation from that shown in the drawings. In such instance, each of tab 24 would be presented at the top and bottom of plug 1 as held by overconnector 10, and adapter 9 would be characterized by tab receiving slots 71A on each of walls 75B. Then, referring to FIG. 2 and FIG. 3, catch pieces 73 would be oriented ninety degrees within housing 71 of adapter 9 so as to mate with profiled surfaces of plug housing 2 characterized by shaped openings 23, front edges 27, following edges 27A, and notches 23A located side to side of the plug assembly 1 as held by overconnector 10.

Figure 8:
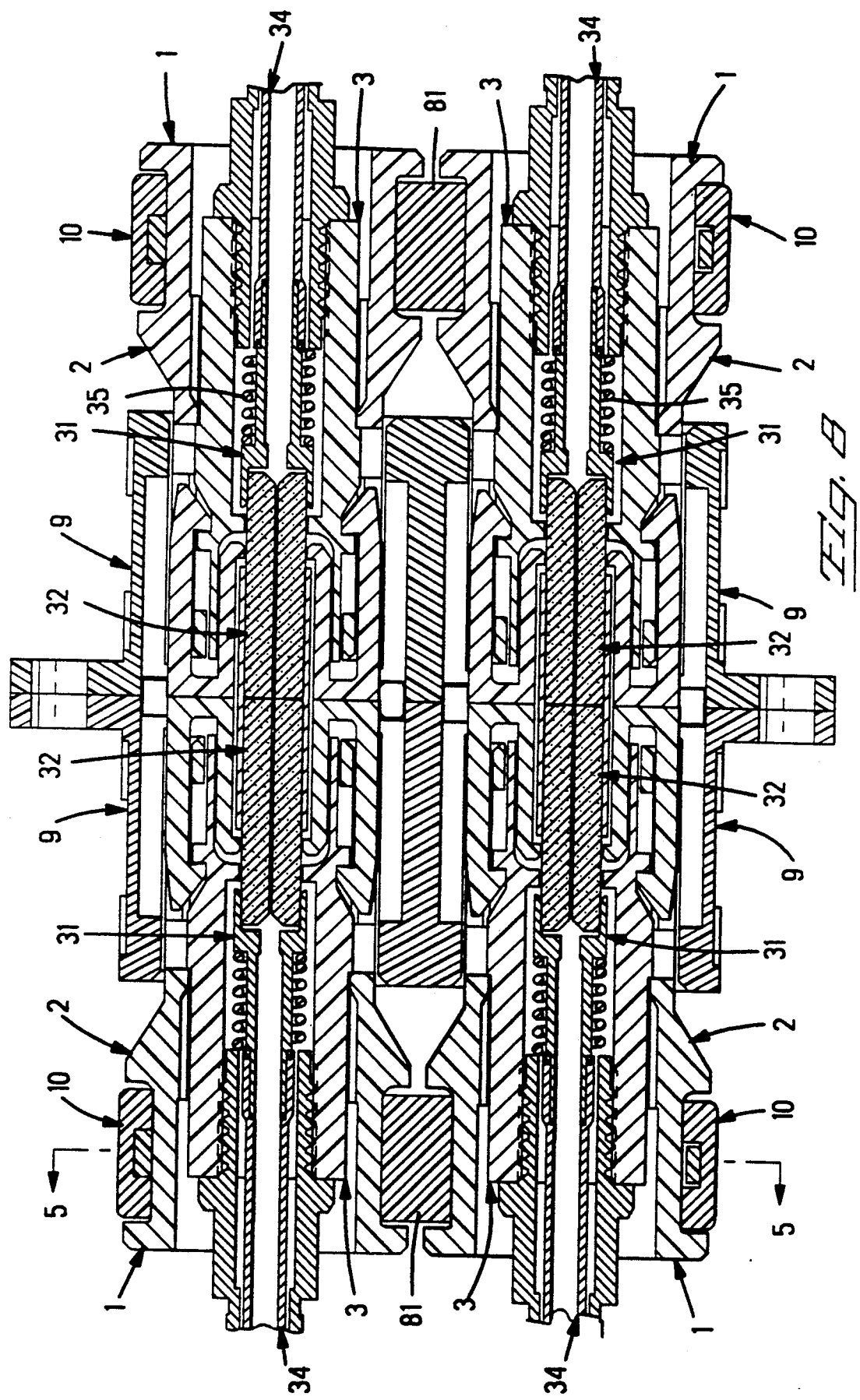
FIG. 8 is a side section view of a pair of push-pull plugs connected by an overconnector assembly, mated to adapter and connected to another pair of push-pull plugs connected by an overconnector assembly and mated to an adapter.

Referring specifically to FIGS. 2 and 8, is shown the overconnector assembly 10 of the present invention comprising a bipartite body with a pair of parts 76 and 77, each having a double compartment interior 78 and 79 having three walls 80, 81 and 82 depending from a common base 83 with each compartment being open at one side. The compartments 78 and 79 of one part 76 intimately fit to surface 14 and partially to surfaces 13 and 15 of the rear section 11 of plug housing 2, held precisely by ridges 18 and 19 and 20 and 21. Correspondingly, compartments 78 and 79 of the second part 77 intimately fit to surface 16 and to remaining exposed surfaces 13 and 15 and, again, held precisely by ridges 18 and 19 and 20 and 21.

Of particular note, with regard to overconnector assembly 10 is that each part 76 and 77, has at one wall 80, a depending square snap catch 84, and each opposite wall 82 has projection 85 with beveled leading surface 86. Parts 76 and 77 are fitted together by inserting projection 85 of one part 76 to engage snap catch 84 of the second part 77 and correspondingly, at the opposite end, inserting projection 85 of the second part 77 to engage the snap catch 84 of first part 76. The resulting overconnector assembly 10 is a two-compartment 78, 79 bipartite body, each compartment forming a precisely shaped profile conforming to the shape of the outer surfaces 13, 14, 15 and 16 of the rear section 11 of the plug housing 2 of plug assembly 1. Of particular advantage is that overconnector assembly 10 is easily fitted together, securely encompassing the outer profiles of the two plug assemblies 1, without requiring screws, bolts or other connectors, to form a duplex connector. Further provided are finger indentations 87 running longitudinal to overconnector assembly to which facilitate the easy connect of the overconnector assembly 10 to the pair of plug assemblies 1 whereby simplex connectors or a duplex connector may be provided as the case may require. Indentations 87 are shown in this embodiment, but pebbling of outer wall 83 or the providing of other types of surface treatment to facilitate gripping are within the scope of the present invention.

While what has been described constitutes a presently preferred embodiment of the invention, it should be recognized that the overconnector assembly may take numerous other forms. Further, it should be recognized that the overconnector assembly is applicable to other pairs of push-pull type connectors in addition to those specifically described in this preferred embodiment. Accordingly, it should be understood that the invention is to be limited only insofar as required by the scope of the following claims.

We claim:
1. A duplex connector comprising:
a pair of simplex optical fiber connectors, each simplex optical fiber connector of the pair having a defined exterior profile, and an overconnector assembly that operates the simplex optical fiber connectors as a duplex connector, said overconnector assembly comprising; a bipartite body of fitted together parts with a double compartment interior, the interior of each compartment having a precisely shaped profile conforming to the shape of the defined exterior profile of a corresponding simplex optical fiber connector of the pair,
a first part and a second part of said bipartite body, each part being constructed with three walls depending from a common base to define a double compartment interior, each compartment being open at one side.
2. A duplex connector as recited in claim 1 wherein, each of the parts of said bipartite body has a snap catch located at a first depending wall, and has a projection with a beveled leading surface located at a second depending wall opposite the first wall of the other of the parts, the parts being fitted together and being fit to said pair of simplex optical fiber connectors with the projection of the first part engaged with the snap catch of the second part, and with the projection of the second part engaged with the snap catch of the first part to form a duplex connector with said pair of simplex optical fiber connectors.
3. A duplex connector as recited in claim 2 wherein, the exterior of said overconnector assembly is characterized by finger indentations.
4. A duplex connector as recited in claim 1, wherein each simplex optical fiber connector is received by said first part and said second part of said bipartite body.
5. A duplex connector as recited in claim 1, wherein the profile of each of said simplex fiber optic connectors has four flat surface areas respectively received by said bases and walls of said fitted together parts.
6. A duplex connector as recited in claim 5, wherein each of said simplex fiber optic connectors has a projecting tab, and said four flat areas of each said simplex fiber optic connector are adapted for rotation ninety degrees to be held by said fitted together parts.

* * * * *